UNITED STATES PATENT OFFICE.

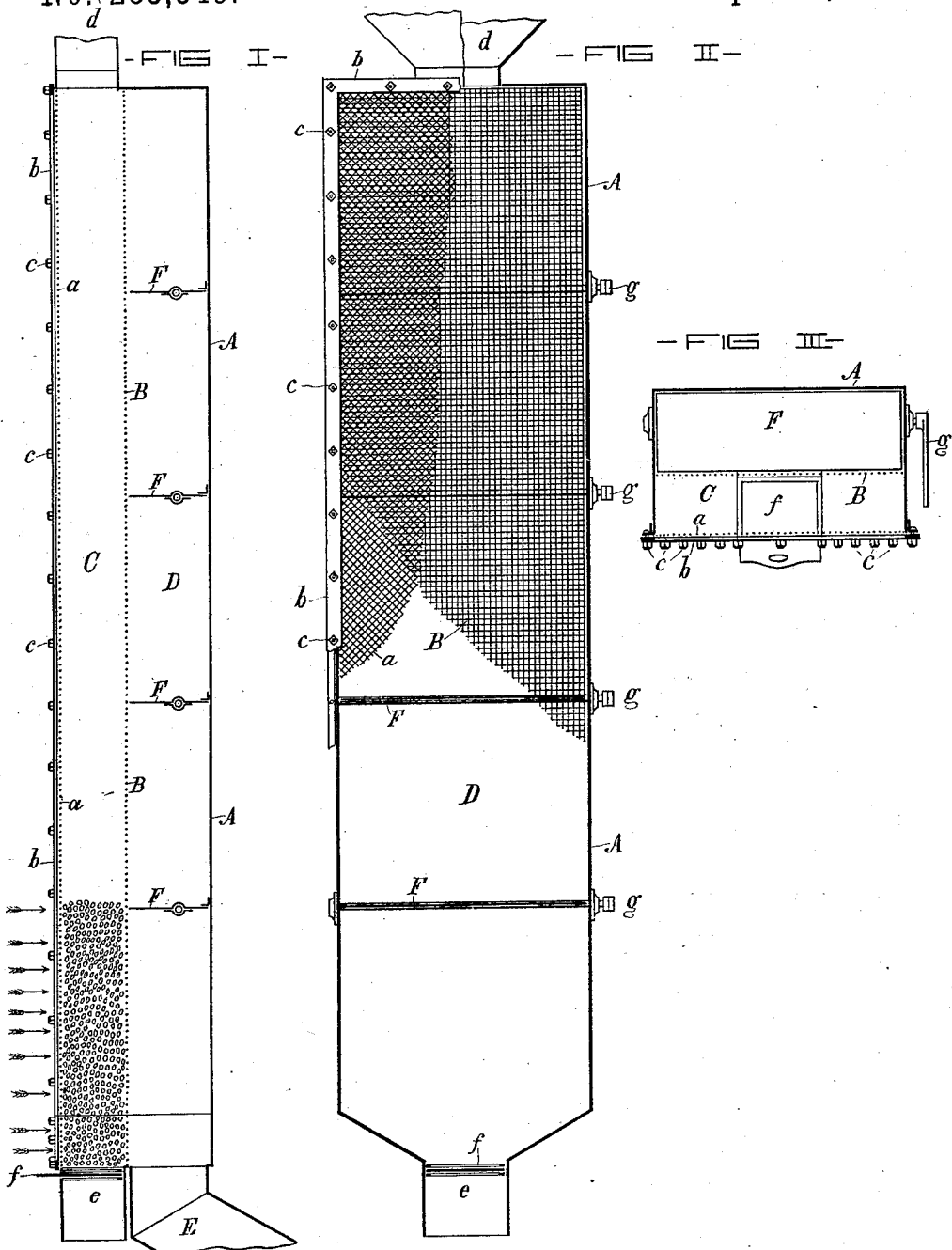

JOHN P. EMERSON, OF BALTIMORE, MARYLAND, ASSIGNOR OF ONE-HALF TO E. LEVERING & CO., OF SAME PLACE.

COFFEE-COOLER.

SPECIFICATION forming part of Letters Patent No. 285,349, dated September 18, 1883.

Application filed July 10, 1883. (No model.)

*To all whom it may concern:*

Be it known that I, JOHN P. EMERSON, of the city of Baltimore, and State of Maryland, have made certain Improvements in Apparatus for Cooling Roasted Coffee, of which the following is a specification.

The object of this invention is to construct an apparatus for the above-named purpose in such manner that no manipulation of the coffee other than its introduction to and discharge from the same is necessary, and which is adapted to cool a large or small bulk of coffee with equal facility, as will hereinafter fully appear.

In the description of the apparatus which follows reference is made to the accompanying drawings, forming a part hereof, in which—

Figure I is a sectional side elevation of the invention; Fig. II, a partly-sectional front view of the same, and Fig. III a transverse section of the apparatus.

Similar letters of reference indicate similar parts in all the views.

A is a box, having a wire-work front, $a$, secured to the box by means of a bar, $b$, and bolts $c$. The box has a wire-work partition, B, which divides it into two compartments—viz., a coffee-chamber, C, and an air-chamber, D. The coffee-chamber has an inlet-funnel, $d$, for the entrance of hot roasted coffee, and an outlet-pipe, $e$, having a gate, $f$, to be used as a means of discharge after the coffee is cooled. A pipe, E, extends from the lower end of the air-chamber D to an exhaust-fan, or to some other air-exhausting apparatus, which, as it forms no part of the present invention, is not shown or described.

F F are dampers to divide the air-chamber D into sections, and they have levers $g$, by means of which they are opened and closed. Supposing the charge of hot roasted coffee to be large enough to fill the entire coffee-chamber, all the dampers F are opened, when the exhaust-fan is supplied with air through the whole body of coffee, which is cooled and the dust removed therefrom. If the charge of coffee extends only to, say, the second damper from the bottom, this damper is closed and the one below it opened. Air is thus prevented from entering the air-chamber, except through the interstices between the coffee-berries, the upper portion of the apparatus above the coffee being unaffected by the blast.

In the drawings the coffee is represented as extending to a point slightly above the lowest damper, which is closed, and the direction of the air entering the apparatus is indicated by the arrows.

While this invention is especially adapted for cooling roasted coffee, it is evident that it could be used for drying and cooling grain, and in such alternative uses an air-forcing device could be employed instead of the suction-fan and the discharge effected outward through the wire-work face $a$.

I claim as my invention—

An apparatus for cooling roasted coffee, which consists, essentially, of a practically-vertical box having a wire-work face divided into two chambers, the front one for coffee, and provided with suitable inlet and outlet apertures, whereby the movement of coffee to and from the said chamber is effected by gravity, and the rear compartment adapted as an air-chamber, combined with an air-exhaust pipe, and suitable dampers to separate it into compartments, substantially as and for the purpose specified.

JOHN P. EMERSON.

Witnesses:
JOHN WILLIAMS,
EDWARD J. DIGGS.